(12) United States Patent
Rajagopalan

(10) Patent No.: US 6,914,349 B2
(45) Date of Patent: Jul. 5, 2005

(54) UNIVERSAL UNINTERRUPTIBLE POWER SUPPLY INPUT CIRCUITRY AND METHODS FOR CONFIGURING SAME

(75) Inventor: Ramamoorthy Rajagopalan, Austin, TX (US)

(73) Assignee: Active Power, Inc., Austin, TX (US)

( * ) Notice: Subject to any disclaimer, the term of this patent is extended or adjusted under 35 U.S.C. 154(b) by 413 days.

(21) Appl. No.: 10/090,050

(22) Filed: Feb. 27, 2002

(65) Prior Publication Data

US 2003/0160514 A1 Aug. 28, 2003

(51) Int. Cl.[7] .................................................. H02J 7/00
(52) U.S. Cl. ...................................................... 307/65
(58) Field of Search .............................. 307/65, 64, 66, 307/82, 80

(56) References Cited

U.S. PATENT DOCUMENTS

| | | | | |
|---|---|---|---|---|
| 5,465,011 A | * | 11/1995 | Miller et al. ................... | 307/64 |
| 5,994,794 A | | 11/1999 | Wehrlen ........................ | 307/66 |
| 6,121,695 A | * | 9/2000 | Loh ............................... | 307/64 |
| 6,134,124 A | | 10/2000 | Jungreis et al. ............... | 363/34 |
| 6,753,622 B2 | * | 6/2004 | Oughton, Jr. ................. | 307/64 |

* cited by examiner

*Primary Examiner*—Shawn Riley
(74) *Attorney, Agent, or Firm*—Fish & Neave IP Group of Ropes & Gray LLP (57) ABSTRACT

Systems and methods of universal uninterruptible power supply (UPS) input circuitry are provided. The input circuitry of the present invention enables a UPS system to simply connect and operate in conjunction with any suitable backup power system. In particular, once a user indicates what backup system is attached to the input circuitry, a software unit automatically configures the input circuitry to operate with the coupled backup system. Once configured, the software unit may control portions of the input circuitry such that power is continuously provided to a load. For example, once a user indicates that a flywheel based backup system is attached, the software unit may instruct the input circuitry to maintain a predetermined flywheel speed (e.g., RPM) to ensure that the system is in constant ready state to deliver backup power.

26 Claims, 7 Drawing Sheets

UNIVERSAL UNINTERRUPTIBLE POWER SUPPLY INPUT CIRCUITRY AND METHODS FOR CONFIGURING SAME

BACKGROUND OF THE INVENTION

The present invention relates to uninterruptible power supply ("UPS") systems, and more particularly to the input circuitry of UPS systems. The universal UPS input circuitry of the present invention can be used with essentially any UPS system to support any suitable type of backup power system commonly used with uninterruptible power supplies.

Utility companies typically provide regulated power to loads present on the utility's distribution network. Sometimes, however, the requisite power is not provided for a particular load. This can be caused, for example, by a blown transformer or downed power lines or other outage. In these instances, the load may receive power that is insufficient to sustain normal operation or it may not receive power at all. The lull in power may last for a few seconds or for days, depending on the severity of the utility supply problem. Therefore, UPS systems have been developed to ensure that continuous supply of regulated power is provided to a load. UPS systems typically operate in two different modes, normal mode and backup mode, both of which are discussed in more detail below.

In a typical UPS system, utility power is provided to the load during normal mode operation. In normal mode operation, the UPS system monitors the quality (e.g., frequency, harmonic distortion, etc.) and the quantity (e.g., magnitude of voltage, current, and power) of utility power provided to the load. During this mode, the UPS system provides power to the load that is substantially regulated to predetermined limits set for utility power distribution. In addition, during normal mode, the UPS system may provide utility power to a backup system. Providing power to a backup system may ensure that it is constantly prepared to enter backup mode operation. When the power provided by the utility falls outside the predetermined limits, the UPS system may switch from normal mode operation to backup mode operation.

In backup mode operation, the UPS system draws power from a backup system and provides it to the load. The UPS system may continuously utilize the backup system to provide power to the load until the utility power is restored. In prolonged utility failures, the UPS system may have to switch between two or more backup systems to provide adequate power to the load. Multiple backup systems may be used to provide both short and long term backup power. One backup system may, for example, provide essentially instantaneous power for a short period of time (e.g., fifteen seconds). Another backup system may be used to provide backup power for longer periods of time (e.g., several days), but not instantaneous power to the load. During backup mode, the power drawn from the backup system may be converted or modified (e.g., the system may change a DC signal to an AC signal) to obtain the desired signal for the load. When utility power is restored, the UPS system may revert back to normal mode operation, thus ceasing the draw of power from the backup system.

There are several different types of backup power systems in which a UPS system may rely on for backup power. This can present difficulties in installation or result in complex setup procedures because each type of backup system may operate using a specific set of parameters, which the UPS system must control or adhere to in order to function properly. For example, whenever a backup system is installed with a UPS system, the UPS system may have to take into account parameters such as AC or DC generated signals, varying ranges of output voltage. If an AC backup system is used, varying ranges in frequency must be accounted for, and the duration of which the system can provide power to a particular load may also differ, as well as various other suitable parameters.

When a user adds or replaces a UPS system that is operating in conjunction with an existing backup power system, the new UPS system may have to undergo extensive re-configurations. For example, if the existing backup power system is a manually operated diesel power generator, a newly added UPS system may require extensive setup time to operate in conjunction with that generator. Furthermore, UPS system configuration may be made even more difficult if the user is installing a UPS system that automatically monitors the generator (e.g., power output).

In view of the foregoing, it is an object of this invention to provide universal UPS input circuitry that readily accepts any type of backup system for use in a UPS system.

It is also an object of this invention to utilize software that configures the universal UPS input circuitry to operate in conjunction with the backup system.

SUMMARY OF THE INVENTION

These and other objects of the invention are accomplished in accordance with the principles of the present invention by providing universal UPS input circuitry. Once a backup power system is connected to the input circuitry, a user may indicate to a software unit which backup system is connected. When the backup system is identified, the software unit may automatically enable monitoring devices and control mechanisms specifically required of that backup system to automatically configure the system. This advantageously eliminates the need for custom hardware and software configurations of the UPS system coupled to that backup system. Moreover, the software unit responsible for configuring the input circuitry may be upgradeable (e.g., new drivers may be downloaded into the unit). This may allow newly manufactured or existing backup systems to be easily installed in conjunction with the UPS system using the present invention. The universal UPS input circuitry may also provide a user with the ability to interchange backup systems by simply instructing the software unit to reconfigure the input circuitry.

In preferred embodiments of the present invention, universal UPS input circuitry may include a diode bride, a boost converter, and an auxiliary converter. For example, a diode bridge is generally used to rectify AC signals provided by AC generating backup systems. The diode bridge provides a DC signal to the boost converter, which raises the DC voltage to a voltage level suitable for use by the UPS system. The auxiliary converter can provide any one of several functions, but preferably provides a function required by the backup system. For example, if a backup system utilizes a battery or multiple batteries, the software unit may operate the auxiliary converter as a battery charger. In another approach, the software unit may use the auxiliary converter to control the speed (in RPM) of a flywheel in a flywheel based backup system.

If multiple backup systems are connected to the UPS system, then additional diode bridge/auxiliary converter pairs are needed. Additional boost converters are not needed because only one backup system can provide power to the load at a time. Therefore, when the UPS system is in backup mode, the software unit selectively connects one of the diode bridge/auxiliary converter pairs to the boost converter. If needed, the software unit can switch over to the other backup system by connecting the diode bridge/auxiliary converter pair associated with that other backup system.

In another embodiment of the present invention, a UPS system may be constructed with universal UPS input circuitry that is configured to interconnect with a predetermined subset of backup power systems. The input circuitry in this embodiment may be constructed with several slots or sockets that are only populated with the circuits (e.g., diode bridge, boost converter, auxiliary converter, etc.) necessary for interconnecting that particular subset of backup power systems to the UPS system. This advantageously enables a manufacturer to reduce manufacturing cost during construction of the UPS systems. If additional or different backup systems are to be connected to the UPS system, then the requisite circuitry can be installed in the slots such that the input circuitry can accommodate those backup systems.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
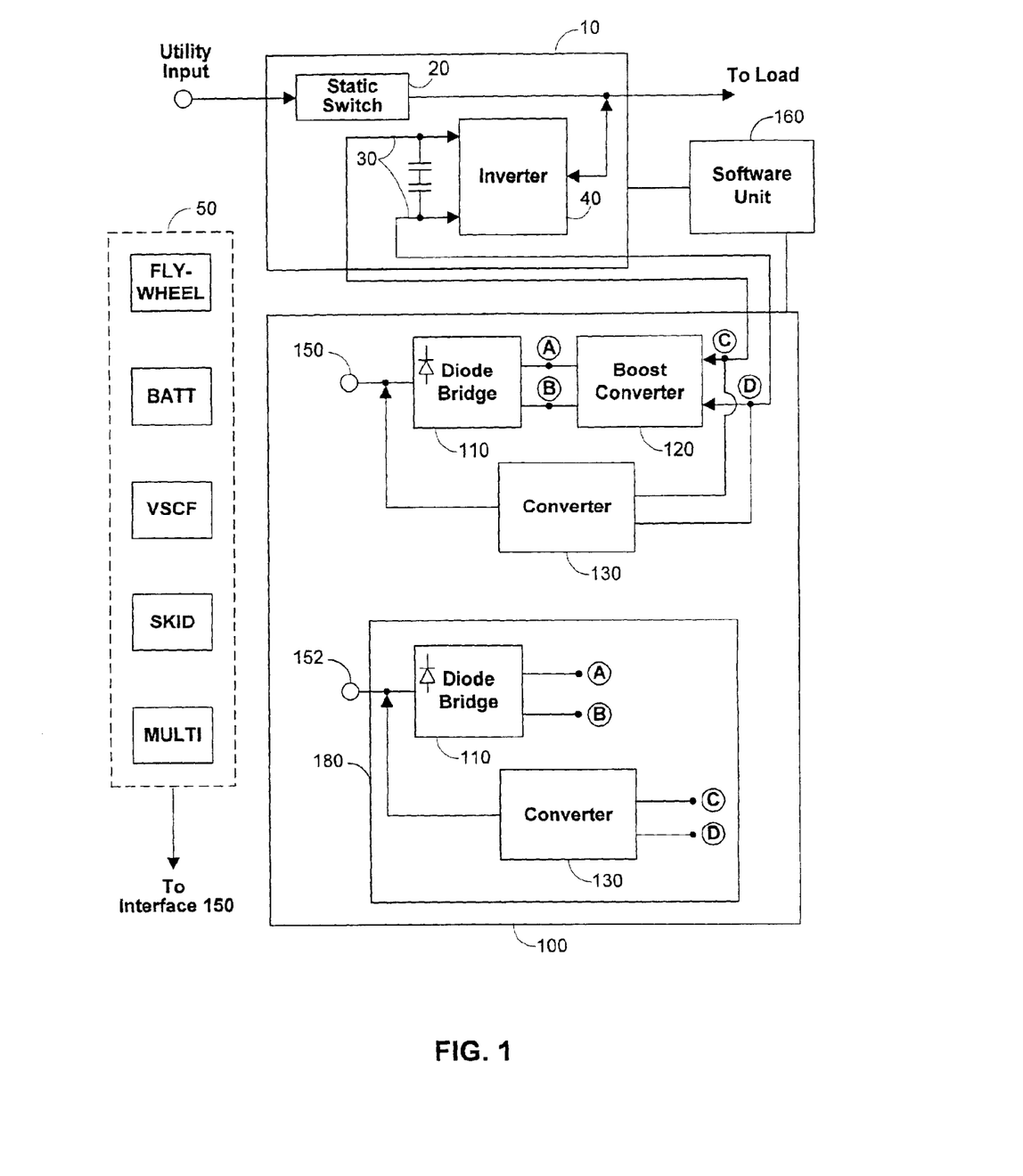
FIG. 1 is a schematic block diagram of a UPS system utilizing universal UPS input circuitry according to the principles of the present invention.

FIG. 1 shows a schematic block diagram of an uninterruptible power supply (UPS) system 10 coupled to universal UPS input circuitry 100, which is constructed in accordance with the principles of the present invention. Also shown in FIG. 1 are several different types of backup systems 50. Those backup systems may include various types, such as: flywheel, battery, variable speed constant frequency, SKID mounted, and multiple system based backup systems, or any other type of backup system that may be used with a UPS system. While five different backup systems are shown, persons skilled in the art will appreciate that any number of backup systems may be used, including a single backup system. Any one of backup systems 50 can be attached to universal interface 150 for use in conjunction with UPS system 10 and input circuitry 100. Furthermore, software unit 160 may be used to provide control, configuration, and monitoring functionality for UPS system 10, backup systems 50, input circuitry 100, or any combination thereof.

UPS system 10 may include static switch 20, DC bus 30, and inverter 40. UPS input circuitry 100 may include diode bridge 110, boost converter 120, and auxiliary converter 130. In some applications, UPS input circuitry 100 can include an additional diode bridge/auxiliary converter pair 180. The core elements in universal UPS input circuitry 100 provide advantages over conventional systems, and thus, are described separately below.

UPS system 10 is discussed first. UPS system 10 may be used to ensure that continuous regulated power is provided to a load. Continuous regulated power may be provided to the load when UPS system 10 is operating in normal mode or backup mode. When operating in normal mode, UPS system 10 may provide utility power (e.g., 480 VAC at 60 Hz) through static switch 20 (when closed) to a load coupled to the system. When providing power to the load, UPS electronics (e.g., software unit 160) may monitor the quality of the power signal provided to the load by measuring, for example, frequency, amplitude, and/or phase angle of the power signal. If any parameter of the power signal does not meet a predetermined condition or falls outside of a given range, UPS system 10 may switch to backup mode and draw power from a backup system.

Inverter 40 may operate to provide "clean" power to the load regardless of whether the power is provided by a power company (e.g., utility) or a backup system. During normal mode operation (i.e., UPS system 10 is providing utility power to the load), the power signal provided by the utility may be conditioned or regulated by inverter 40. Inverter 40 may, for example, condition the power provided to the load by attenuating unwanted harmonics. Furthermore, inverter 40 may also be used to provide power to the backup system via DC bus 30. This power may be directed by auxiliary converter 130 to one or more backup systems such that each system is maintained in a ready state (e.g., a ready state that enables the backup system to provide substantially instantaneous backup power on demand).

In backup mode operation, inverter 40 may condition and provide power (produced by a backup system) to the load. In accordance with the principles of the present invention, inverter 40 may invert DC voltage provided on bi-directional DC bus 30 and convert that DC voltage to an AC signal suitable for the load. Inverter 40 may, for example, convert the DC signal to a desired AC signal having a predetermined voltage and frequency.

UPS system 10 is shown to be constructed as a single conversion UPS system. The conversion process in a single conversion UPS system typically involves converting a DC signal into an AC signal. For example, if inverter 40 regulates the utility power provided to the load, then inverter 40 may perform single conversion by converting a DC signal into an AC signal to provide power regulation. Persons skilled in the art will appreciate that UPS system 10 can also be constructed as a double conversion system (not shown). Double conversion systems may provide the UPS system with additional control in providing and regulating the power delivered to the load. A double conversion system typically converts signals from AC to DC and back into AC.

Additional circuitry (e.g., AC-DC converter) may have to be added to UPS system 10 if such a configuration is desired.

Figure 2:
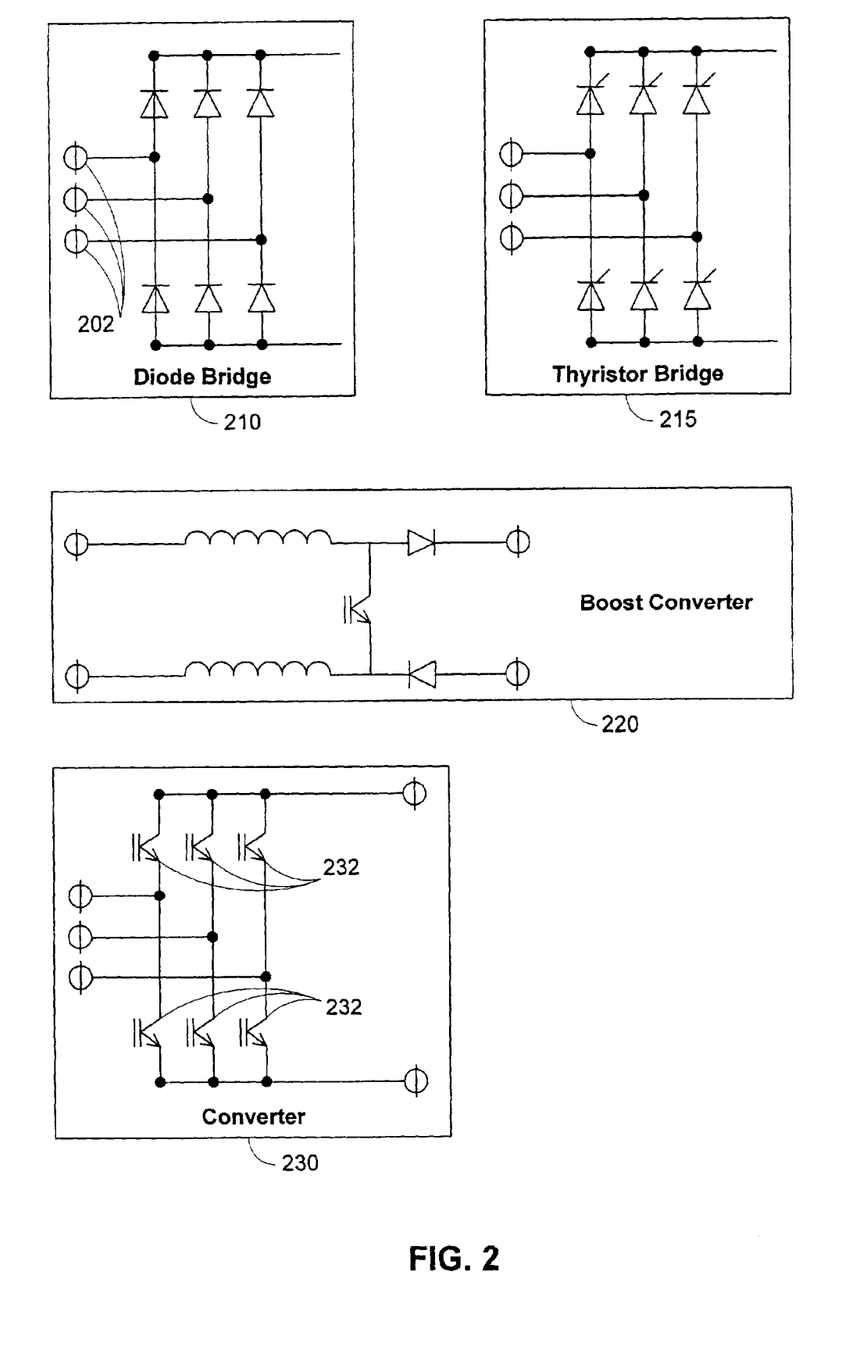
FIG. 2 illustrates several detailed circuit diagrams of core elements included in universal UPS input circuitry according to the principles of the present invention.

Referring now to universal UPS input circuitry 100, which, in general, accepts power provided by a backup system (which is connected to input circuitry 100 via universal interface 150). If the backup power system provides power in the form of an AC signal, diode bridge 110 may rectify the AC signal to provide a DC signal to boost converter 120. FIG. 2 illustrates a detailed circuit diagram of a diode bridge 210 suitable for use as diode bride 110 in input circuitry 100 to rectify an AC signal. It should be noted that, for convenience and clarity, similar components of different embodiments are similarly numbered. For example, the diode bridge of FIG. 1 is numbered "110" (where 1XX generally refers to components identified in FIG. 1), while the diode bridge of FIG. 2 is numbered "210."

This particular illustration shows a diode bridge that is capable of rectifying a three-phase AC signal that would be received at inputs 202. FIG. 2 also illustrates thyristor bridge 215 which can be used in place of diode bridge 110 in input circuitry 100 to rectify an AC signal. One advantage of thyristor bridge 215 over diode bridge 210 is that it can provide effective electrical isolation between the backup power system and input circuitry 100. Electrical isolation may be provided because the gate of the thyristor can be controlled to adjust the rectification of the AC signal. For example, when the thyristor is gated to be OFF, no rectification of the signal transpires, and boost converter 120 is electrically isolated from the backup system. However, when the thyristor is gated to be fully ON, the thyristor will operate similarly with respect to a diode.

Referring back to FIG. 1, boost converter 120 may receive a DC signal provided by diode bridge 110. Boost converter 120 is included with input circuitry 100 because the voltage provided by diode bridge 110 may be too low to be suitable for inverter 40 to convert it to an AC signal having a suitable voltage for the load. (Generally, when converting a DC voltage to an AC voltage signal, the peak AC voltage is not equivalent the average DC voltage). Therefore, it may be desirable to increase the DC voltage to a suitable level (e.g., 800 VDC) that provides proper voltage to the load after the DC signal is converted to an AC signal. Boost converter 220, such as that illustrated in FIG. 2, may utilize DC-DC conversion techniques necessary to increase the DC voltage, in the place of boost converter 120 of FIG. 1.

Auxiliary converter 130 may provide operational signals in response to monitored parameters associated with the backup system or input circuitry 100. During normal mode or backup mode operation, auxiliary converter 130 may be controlled (by software unit 160) to provide operational inputs to the backup system. The operational inputs provided by auxiliary converter may include, for example, controlled delivery of power to the backup system, motoring control, active harmonic filtering, or any other suitable control. A generalized illustration of auxiliary converter 230 is shown in FIG. 2, which is one embodiment of converter 130 of FIG. 1. This embodiment shows auxiliary converter 230 to include six transistors 232, which can be controlled to provide operational inputs to the backup system itself. In an alternative approach, auxiliary converter 130 can provide operational signals in response to signals generated by the backup system.

Preferably, auxiliary converter 130 is specially adapted to the backup power supply coupled to input circuitry 100. For example, if the backup system uses a flywheel backup system, then auxiliary converter 130 may provide the motoring function to the flywheel system to maintain the desired flywheel RPM. In other approaches, auxiliary converter 130 can recharge a battery in a battery-based backup power system or provide active filtering for a variable speed constant frequency ("VSCF") backup system.

FIG. 1 also illustrates that two or more backup power systems can be connected to universal UPS input circuitry 100. As shown, each additional backup system is coupled to another instance of universal interface 150 (shown as interface 152 on the second circuit), which is further associated with another diode bridge/auxiliary converter pair. Additional boost converters are not needed for each backup system because only one backup system can provide power to the load at a time. Therefore, when the UPS system is in backup mode, software unit 160 selectively connects one of the diode bridge/auxiliary converter pairs to the boost converter 120. If needed, software unit 160 can switch another backup system by connecting an associated diode bridge/auxiliary converter pair to boost converter 120. Such a multiple backup power supply arrangement can, for example, advantageously provide immediate short-lived power (e.g., from a battery backup power system) and also provide long-term power (e.g., from a VSCF backup power system) to the load if utility power fails.

If two or more backup power supplies are coupled to universal UPS input circuitry, software unit 160 may provide multiple channels (e.g., one for each backup system) so that each backup power system receives operational signals. For example, it may be necessary for each backup power supply to be kept in a relatively constant ready state. Consider, for example, a UPS system coupled to a flywheel-based backup system and a VSCF backup system. In such a configuration, software unit 160 can provide both of these systems with the requisite operational signals to maintain each system in a constant ready state. Thus, during backup mode, either backup system can be selected to provide power to a load because each backup system is maintained in a constant ready state. Persons skilled in the art will appreciate that software unit 160 may be capable of providing operational signals to any number of backup systems coupled to a UPS system.

Figure 3:
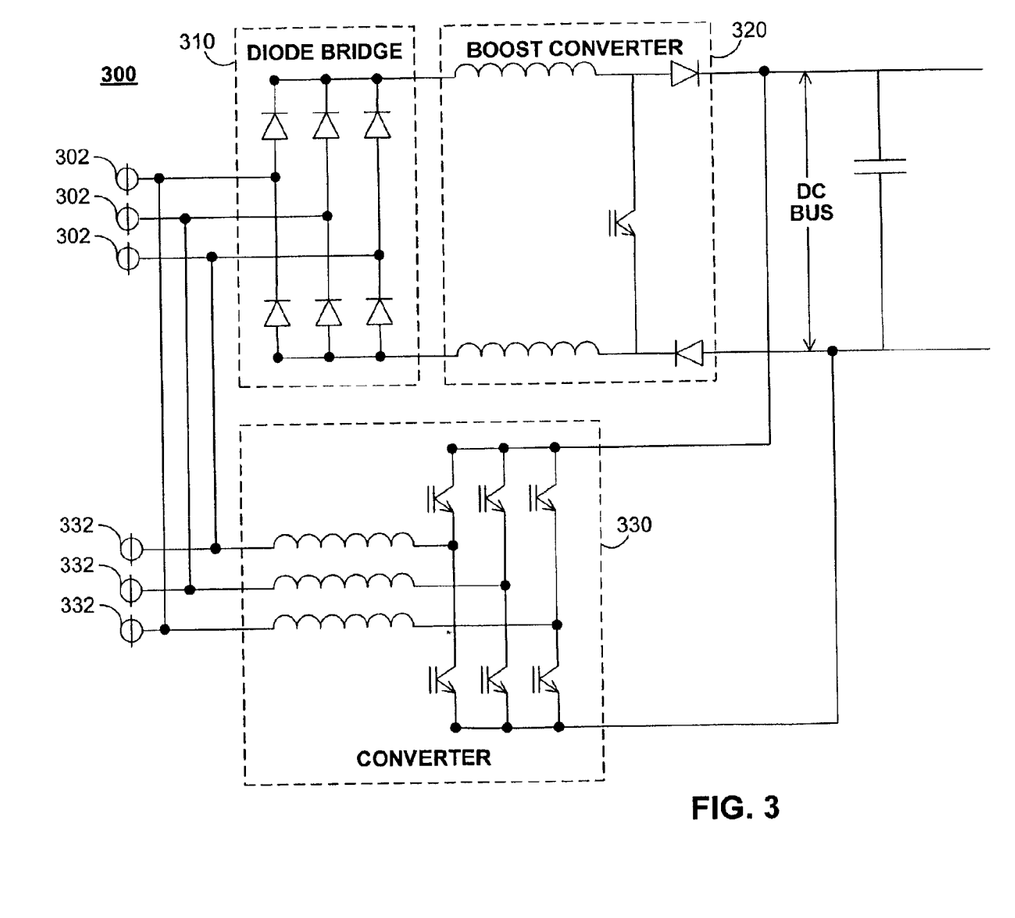
FIG. 3 illustrates a schematic diagram of universal UPS input circuitry that includes the core elements illustrated in FIG. 2 according to the principles of the present invention.
Figure 5:
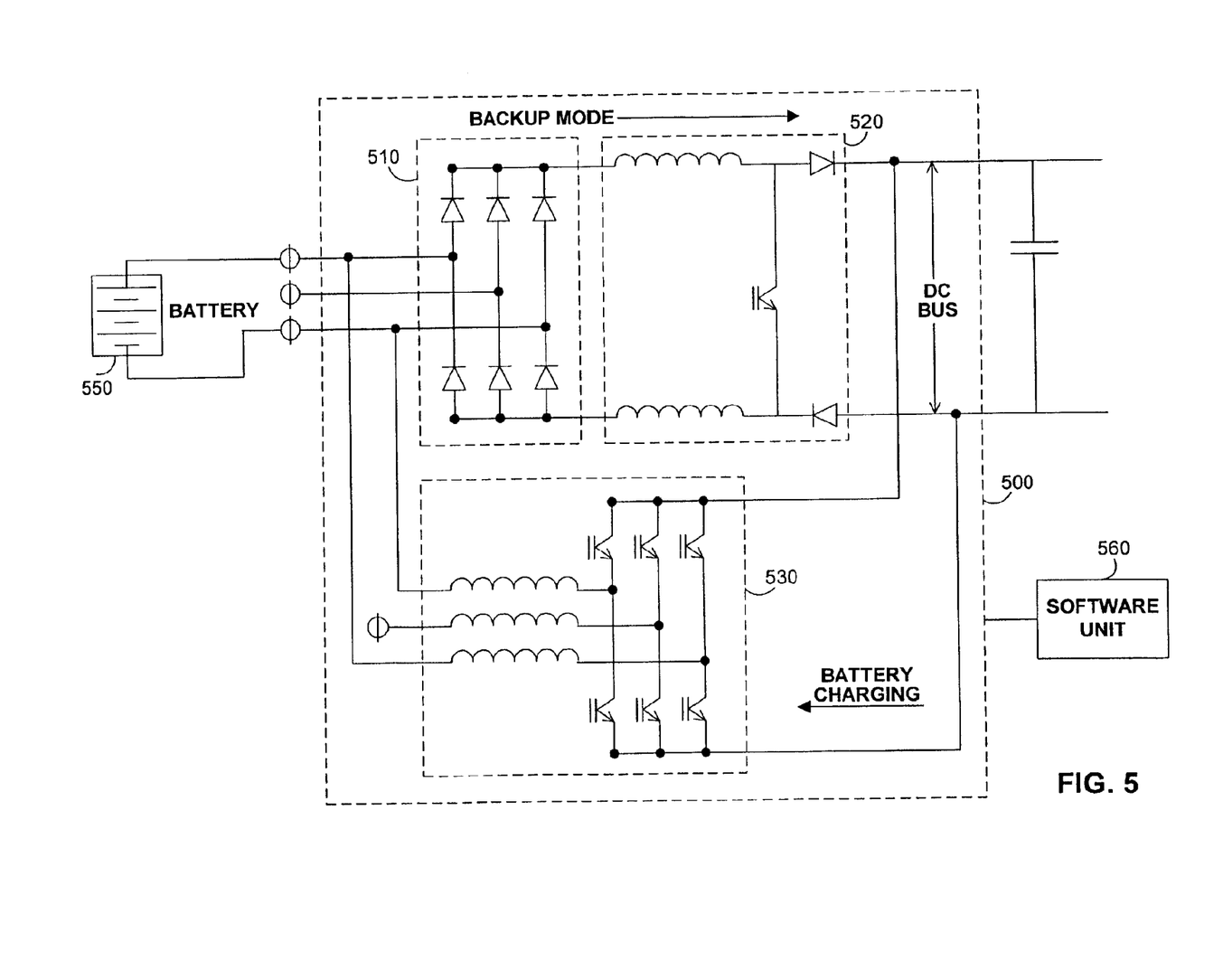
FIG. 5 illustrates a schematic diagram of universal UPS input circuitry used in conjunction with a battery based backup systems according to the principles of the present invention.

FIG. 3 illustrates a generalized schematic diagram of input circuitry 300 constructed in accordance with the present invention. Circuitry 300 includes the core elements (e.g., diode bridge 310, boost converter 320, and auxiliary converter 330) that were previously described with respect to FIGS. 1 and 2. Diode bridge 310 may be coupled between a backup system (not shown in FIG. 3) and boost converter 320. As shown, diode bridge 310 is configured to receive three signals (e.g., one signal for each phase of a three-phase signal) from three different terminals 302 (which may be similar to terminals 202 of FIG. 2) of the backup system. Persons skilled in the art will appreciate that diode bridge 310 can be configured to accept other combinations of signals other than what is shown. For example, FIG. 5 shows an example in which a diode bridge is coupled to only two terminals (e.g., the positive and negative of a battery).

Boost converter 320 is also coupled to a DC bus similar to bus 30. The DC bus maybe coupled to a UPS system (not shown) as is shown in FIG. 1 with respect to UPS 10. Furthermore, the DC bus is coupled to auxiliary converter 330, which provides DC power to auxiliary converter 330. The output of auxiliary converter 330 may be coupled to terminals of a backup system (not shown), the input terminals 302 of diode bridge 310, or both. Depending on the backup system used, auxiliary converter 330 may not be coupled directly to the input terminals of diode bridge 310.

Figure 6:
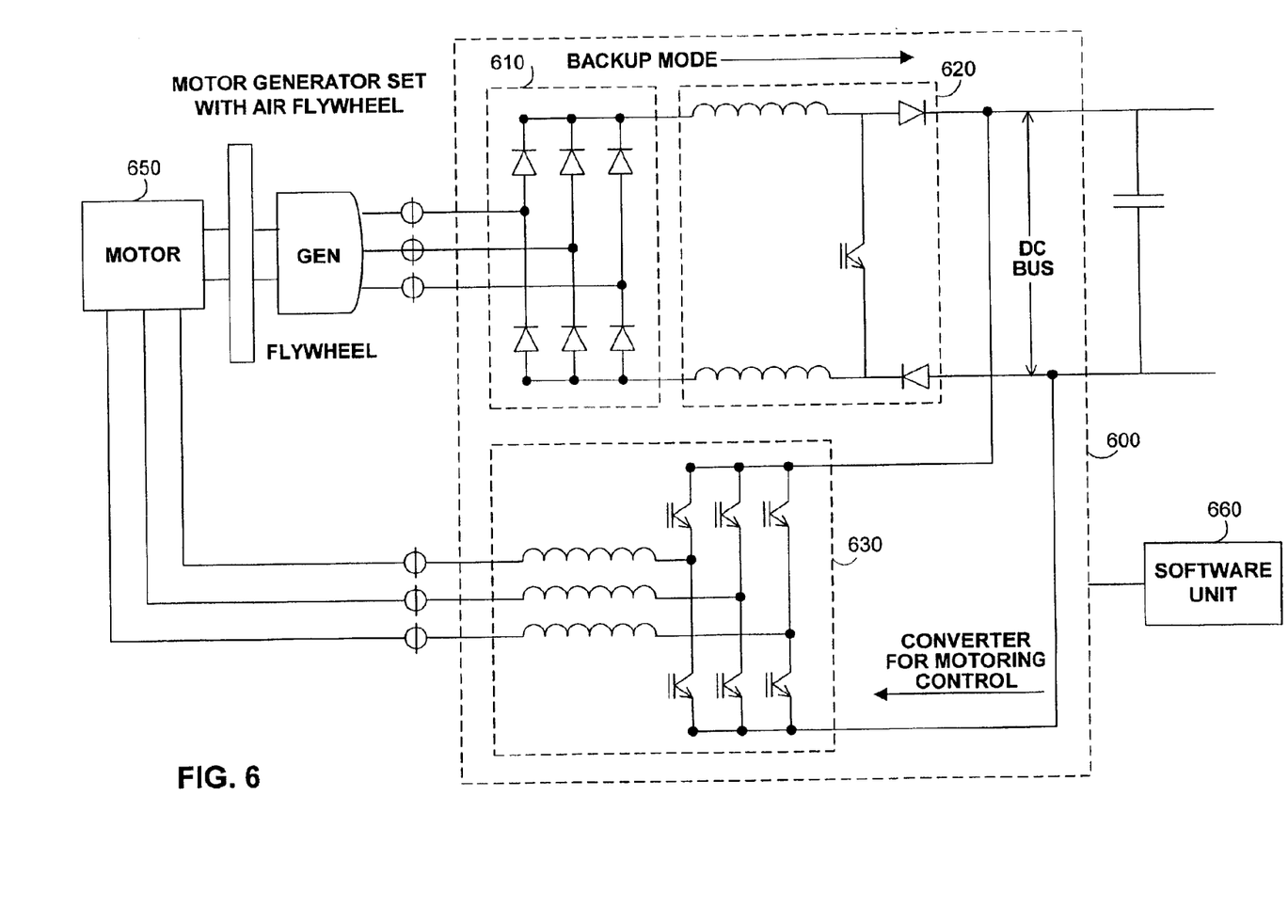
FIG. 6 illustrates a schematic diagram of universal UPS input circuitry used in conjunction with a skid mounted flywheel backup system according to the principles of the present invention.

FIG. 6, for example, illustrates how the output terminals of auxiliary converter 330 may be configured so they are only applied directly to the backup system (as described more fully below).

The three core elements of universal UPS input circuitry 100 are briefly recapitulated as follows. Diode bridge 110 may rectify an AC signal if the backup power system generates an AC power signal. Regardless of whether or not diode bridge 110 rectifies an AC signal, it provides a DC signal to boost converter 120. Boost converter 120 raises the DC voltage level provided by diode bridge 110 to a DC voltage level suitable for application to DC bus 30. Lastly, auxiliary converter 130 provides operational signals in response to monitored parameters such as flywheel speed, battery charge capacity, etc. These elements, particularly boost converter 120 and auxiliary converter 130, may be controlled by software unit 160.

Universal UPS input circuitry 100 may be configured by software to accept and operate in conjunction with one or more backup power system(s) coupled to input circuitry 100. Such software may be located on read-only-memory ("ROM") or on a hard-disk located in software unit 160, which is shown in FIG. 1. The software in software unit 160 provides a user with the ability to easily configure the system to operate with various types of backup power systems for use in conjunction with UPS system 10. Because, typically, many different backup power systems (each having different operational characteristics) are available for connection to input circuitry 100, the present invention enables a user to install or use such backup power systems with relative ease. The user may install any backup power system in conjunction with input circuitry 100 and then utilize the software to configure the system such that input circuitry 100 accepts and operates with the newly installed backup power system.

Software unit 160 of the present invention may be upgradeable such that new or existing backup systems can be easily connected to input circuitry 100. This provides UPS systems using the present invention with added flexibility of being able to be installed for operation with a variety of existing or new backup systems, without requiring specially configured hardware in the UPS. For example, assume that a manufacturer develops a new type of backup system that is similar in scope to existing backup systems but operates on a different set of parameters. Since this backup system is new, software unit 160 may not have the ability to control or monitor the different set of parameters. Therefore, software unit 160 may receive, for example, new drivers, a software patch, supplemental code, or any other suitable software related item so that input circuitry 100 is configurable to this backup system. Once the software is upgraded in software unit 160, the new backup system may then be used in conjunction with the UPS system.

In general, software unit 160 operates input circuitry 100 as follows. During normal mode, software unit 160 can control auxiliary converter 130 to draw power from DC bus 30 and provide it to the backup system. Then, when the UPS system changes to backup mode, software unit 160 may switch OFF auxiliary converter 130 and control boost converter 120. Boost converter 120 may be controlled to provide the desired voltage to DC bus 30. Hence, the control provided by software unit 160 may ensure a smooth transition between normal mode and backup mode while providing adequate power to the load. The following discussion describes various embodiments of the present invention with respect to different types of backup power systems.

Figure 4:
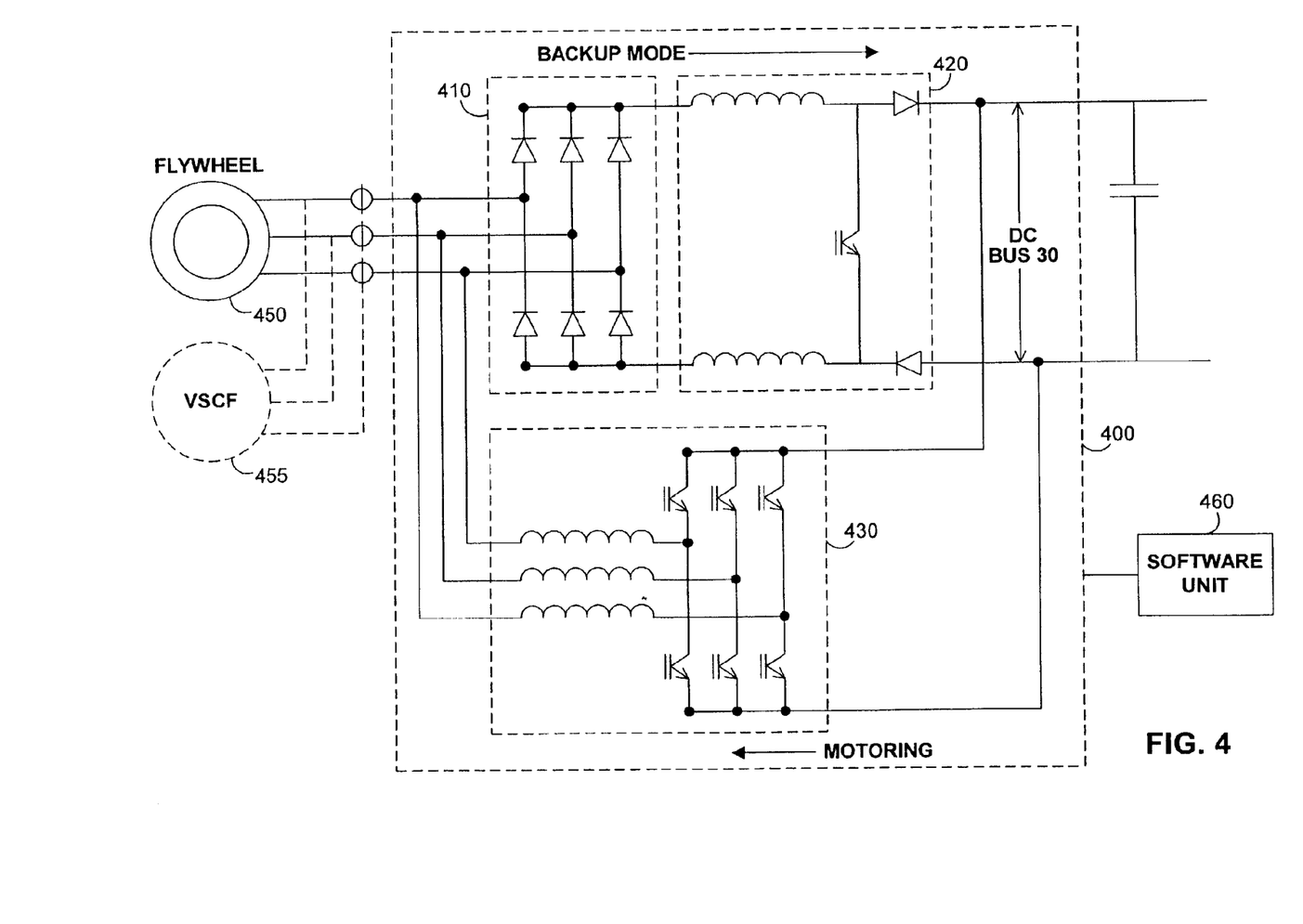
FIG. 4 illustrates a schematic diagram of universal UPS input circuitry used in conjunction with a flywheel based backup system according to the principles of the present invention.

FIG. 4 is a simplified schematic diagram of input circuitry 400 used in conjunction with a flywheel based backup power system 450. Flywheel based systems typically provide about fifteen to twenty seconds of high frequency backup power. To provide long-term backup power, such systems are commonly used in combination with a generator (e.g., diesel generator). Flywheel system 450 requires power (provided by auxiliary converter 430) to perform the motoring function that assists in spinning the flywheel at a predetermined RPM and constant speed, which stores kinetic energy in the flywheel.

When flywheel-based backup power system 450 is providing power to the load, input circuitry 400 is operating in a backup mode. Alternatively, when auxiliary converter 430 is providing power for the motoring function, input circuitry 400 is operating in normal mode (e.g., motoring mode). Assuming that a three-phase brushless DC motor is driven during normal mode, software unit 460 monitors various parameters such as speed, vacuum pressure, field current, armature current, internal temperatures, rotor positions, and any other suitable parameters. These monitored signals are then compared to predetermined settings or ranges and auxiliary converter 430 is controlled accordingly. For example, if the software monitors that the speed of the rotating flywheel drops below the desired range, software unit 460 may instruct auxiliary converter 430 to supply more power to the motor so that it motors the flywheel to the proper speed.

When the user connects flywheel-based backup power system 450 to input circuitry 400, the user simply indicates or selects that backup system using a software interface. The software interface may be, for example, a computer console, a touch screen, or more simply a series of switches such as DIP switches. Once the user makes a selection, software unit 460 automatically enables parameter monitoring and controls required for that backup system. When the backup system is accepted by input circuitry 400, a fully functional UPS system is provided.

In an alternative embodiment, FIG. 4 also illustrates the use of input circuitry 400 used in conjunction with a variable speed constant frequency ("VSCF") backup power system 455 in accordance with the principles of the present invention. For purposes of this embodiment, assume that VSCF backup system 455 replaces the flywheel system illustrated in FIG. 4. VSCF systems typically use an engine to drive a generator which generates constant frequency AC backup power. The engine generally operates at high speeds for efficiency and thus generates a high frequency and high voltage output. When diode bridge 410 rectifies the AC signal provided by the backup system, the current component of the signal is a quasi-square wave. This quasi square wave may have several orders of harmonics, which can cause excessive heating in VSCF system 455 and loss of efficiency.

When a user connects VSCF backup system 455 to input circuitry 400, software unit 460 automatically activates parameter monitoring necessary for operating a fully functional UPS system. In particular, software unit 460 controls auxiliary converter 430 such that it operates as an active harmonic filter when VSCF backup system 455 is used. During operation, software unit 460 determines the exact harmonic current content using a mathematical algorithm. Software unit 460 then controls auxiliary converter 430 to inject the precisely determined harmonic current into the input side of diode bridge 410. The combination of the injected harmonic current and the quasi-square wave current sum together to form substantially the exact sine wave VSCF source current supplied by the VSCF source for efficient operation.

FIG. 5 illustrates a schematic diagram of a battery-based backup system 550 used in conjunction with input circuitry 500 in accordance with the principles of the present invention. Battery backup systems typically use lead-acid batteries, nickel-cadmium batteries, lithium ion batteries, or any other suitable battery type. Battery systems may provide DC output power for about thirty seconds to about ten hours depending upon the number and capacity of batteries used and the load demand. Because batteries provide DC power, diode bridge 510 technically does not have to be utilized. However, to provide consistent interface with other types of backup systems, diode bridge 540 is not removed from input circuitry 500. Rather, battery backup system 550 is coupled to two input terminals instead of all three terminals. Likewise, only two outputs of auxiliary converter 530 are coupled to the battery backup system 550.

When the user selects or defines that battery backup system 550 is to be coupled to input circuitry 500, software unit 560 activates a battery backup system algorithm for properly controlling input circuitry 500. This algorithm may cause auxiliary converter 530 to operate as a battery charger. Thus during normal mode, a controlled charge current may be provided to the battery to keep it fully charged. During backup mode, software unit 560 may switch OFF auxiliary converter 530 and begin controlling boost converter 520. In addition, software unit 560 may perform various functions such as determining the charge content of the battery, computing the remaining backup time under the existing load, and ensure that the system has a controlled shutdown when the battery depletes to a predetermined voltage level.

FIG. 6 illustrates a schematic diagram of a skid mounted flywheel backup system 650 coupled to input circuitry 600 in accordance with the principles of the present invention. Skid mounted flywheel backup systems typically include a motor, flywheel, and a generator. The motor is used to drive the flywheel to rated speed. Then during backup mode, the flywheel may be able to drive the generator for about fifteen seconds to provide AC power to a load. The output terminals of auxiliary converter 630 are coupled to motor of the skid mounted flywheel backup system 650 to provide a motor function during normal mode operation.

When a user identifies that skid mounted flywheel backup system 650 is coupled to input circuitry 600, software unit 660 may automatically enable monitoring and control functionality for such a system. During normal mode, software unit 660 controls the acceleration and maintains constant flywheel speed by operating auxiliary converter 630 as a three-phase variable frequency driver. For example, if the speed of the flywheel is detected to be too low, software unit 660 may instruct auxiliary converter 630 to increase the frequency so that the speed of the flywheel is also increased. During backup mode, software unit 660 may disable auxiliary converter 630 and control boost converter 620. Boost converter 620 draws power from the generator and provides it to the DC bus (as long as there is enough inertia provided by the flywheel to turn the armature of the generator).

Another embodiment of the present invention can include coupling multiple backup systems to the same UPS system. In this approach, each of the backup systems are coupled to separate universal interfaces 150 of input circuitry 100. Similar to the other embodiments described above, software unit 160 may automatically enable monitoring and control functionality for each of the backup systems indicated to be coupled to input circuitry 100. Software unit 160 may also manage the transition of switching from one backup source to another. For example, assume that a battery backup system (short term power) and a VSCF backup system (long term power) are used in conjunction with UPS system 10 (FIG. 1). During normal mode operation, the software may enable circuitry (e.g., auxiliary converter) coupled to the battery backup system. This way, power will be constantly provided to the battery so that is maintained in a ready state. Furthermore, when a backup mode condition is initiated, the battery can provide substantially instantaneous power to the load while the engine in the VSCF backup system is brought up to speed. Once the VSCF backup system generator is operating at sufficient capacity, software unit 160 may transfer backup power delivery from the battery system to the VSCF system. Once the transfer is complete, software unit 160 will monitor and compensate for the harmonics introduced into the backup system.

In yet another embodiment, a UPS system may be constructed with universal UPS input circuitry that is configured to interconnect with a predetermined subset of backup power systems, instead of being constructed to interconnect with any type of backup power system. For example, if industry typically uses battery backup power systems (for short-term backup power) and generators (for long-term backup power), then the input circuitry of the UPS system can be specifically configured for use with such systems. This may enable UPS systems to be constructed, at least initially, only with input circuitry that is required for interconnecting backup power systems typically used in industry or available on the market. This may provide a benefit in cost savings because excessive integration of additional parts or components can be avoided by not implementing various circuit elements (e.g., boost converter, diode bridge, auxiliary converter) in the input circuitry.

A UPS system may be constructed with one or more sockets or slots that can be populated with circuits (e.g., diode bridge, boost converter, and auxiliary converter) to construct the desired input circuitry. For example, if universal UPS input circuitry (as described above) is desired, then several slots may be populated with the requisite circuits to construct such input circuitry. This embodiment, however, is advantageous because a UPS unit may be configured, initially, with input circuitry that includes a subset of the circuits mentioned above. For example, the input circuitry may only include a boost converter. Configuring the UPS system with a subset of input circuitry circuits may allow a manufacture to construct a generic UPS unit that is suitable for interconnection to industry standard backup power systems or other widely available backup power systems. If a user has a backup power system that does not interconnect with the generic UPS system, the requisite circuits can be inserted into one or more of the available slots to enable interconnection between the UPS unit and the backup power system.

Figure 7:
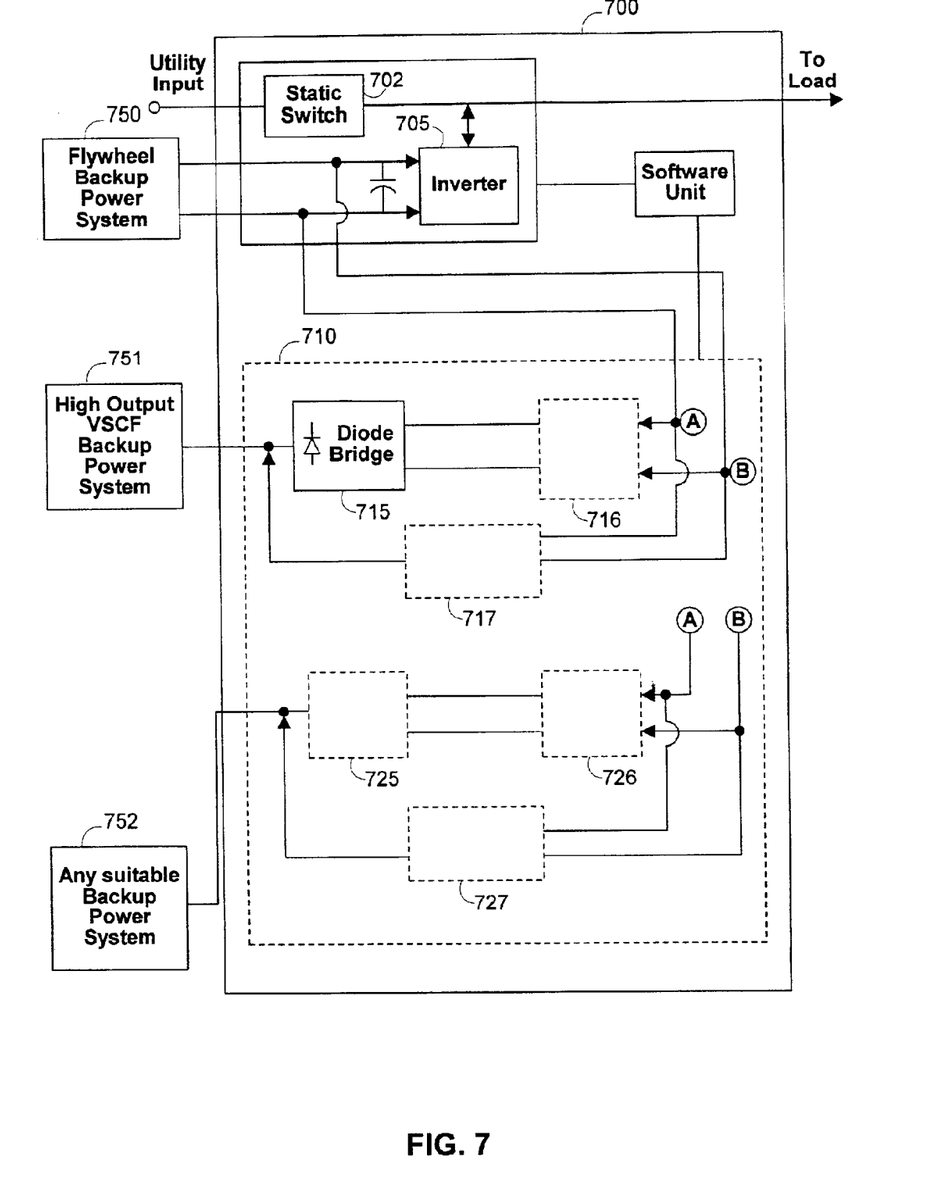
FIG. 7 illustrates a schematic diagram of a generic UPS system having a plurality of slots available for receiving circuitry that enables additional backup systems to interconnect to the generic UPS system in accordance with the principles of the present invention.

FIG. 7 illustrates an example implementation of a generic UPS system having slots for accepting additional input circuitry circuits in accordance with the principles of the present invention. FIG. 7 shows UPS system 700 coupled to receive utility input power via static switch 702, which selectively provides power to a load. UPS system 700 includes inverter 705 which is connected to flywheel backup system 750 and input circuitry 710. Flywheel backup system 750 is connected directly to inverter 705 (bypassing input circuitry 710) because backup system 750 may be a backup power system such as Cleansource2 250 kW flywheel energy storage system, manufactured by Active Power, Inc. of Austin, Tex. This particular type of backup system may be able to produce voltage that is suitable for use by inverter 705 and thus does not have to be connected to input circuitry 710. Thus, flywheel backup system 750 does not require that input circuitry 710 be populated with additional circuitry that is necessary for interconnecting with UPS system 700.

Input circuitry 710 is shown to be constructed with several slots 715, 716, 717, 725, 726, and 727. Slot 715 is shown to be populated with circuitry for a diode bridge, which is required for interconnecting VSCF backup system 751 to UPS system 700. only a diode bridge is needed because VSCF backup system 751 may provide a high output voltage that does not require a boost in voltage (e.g., by a boost converter) or regulation (e.g., by an auxiliary converter).

If desired, any additional backup power system (e.g., backup system 752) may be coupled to input circuitry 710 to provide backup power. For example, if a battery backup power system is implemented with UPS system 700, then input circuitry 710 may be populated with a diode bridge, boost converter, and auxiliary converter in slots 725, 726, and 727, respectively. Once slots 725, 726, and 727 are filled, input circuitry 710 may be able to properly interface with the battery backup power system and provide UPS system 700 with backup power.

Persons skilled in the art will appreciate that any suitable number of the input circuitry slots may be provided on UPS system 700. Since multiple slots may be provided, several different backup power systems can interconnect with input circuitry 710 simultaneously and operate in conjunction with UPS system 700.

Thus it is seen that universal UPS input circuitry can enable any suitable type of backup power system can be coupled to a UPS system. A person skilled in the art will appreciate that the present invention can be practiced by other than the described embodiments, which are presented for purposes of illustration rather than of limitation, and the present invention is limited only by the claims which follow.

What is claimed is:

1. Universal uninterruptible power supply (UPS) input circuitry configured for connecting a backup power system selected from one or more different types of backup power systems to a UPS system, the input circuitry comprising:
   a diode bridge coupled to receive power from the selected backup power system;
   a boost converter coupled to receive the power from the diode bridge;
   an auxiliary converter coupled to the selected backup power system; and
   a software unit coupled to the boost circuitry and the auxiliary circuitry, wherein the software unit controls the operation of the boost circuitry and the auxiliary circuitry based on the selected backup power system.

2. The input circuitry of claim 1, wherein the software unit monitors at least one parameter associated with the selected backup system.

3. The input circuitry of claim 1, wherein the software unit monitors at least one parameter associated with the input circuitry.

4. The input circuitry of claim 1, wherein the software unit provides a user interface that allows a user to select which backup system is coupled to the input circuitry.

5. The input circuitry of claim 1, wherein the software unit controls the operation of the auxiliary converter and the boost circuitry.

6. The input circuitry of claim 1, wherein the auxiliary converter provides signals to the selected backup system to maintain the selected backup system in a ready state.

7. The input circuitry of claim 1, wherein the auxiliary converter provides signals to the diode bridge to compensate for signals generated by the selected backup system.

8. The input circuitry of claim 1, wherein the software unit configures the auxiliary unit to operate as a motor controller.

9. The input circuitry of claim 1, wherein the software unit configures the auxiliary unit operate as a battery charger.

10. The input circuitry of claim 1, wherein the software unit configures the auxiliary unit to operate as an active filter.

11. The input circuitry of claim 1, wherein the diode bridge comprises a plurality of diodes.

12. The input circuitry of claim 1, wherein the diode bridge comprises a plurality of thyristors.

13. A method for configuring universal uninterruptible power supply (UPS) input circuitry to connect a backup power system selected from one or more different back-up systems to a UPS system, the method comprising:
   coupling the selected backup system to the input circuitry;
   providing an indication of which backup system is selected;
   configuring the input circuitry to operate in conjunction with the selected backup system based on the indication; and
   operating the input circuitry such that power is substantially continuously provided to a load.

14. The method of claim 13, wherein the indication comprises selecting a particular type of backup system that is coupled to the input circuitry.

15. The method of claim 13, wherein the configuring comprises activating a first monitoring device.

16. The method of claim 13, wherein the operating comprises controlling an auxiliary converter to provide a motoring function for the selected backup system.

17. The method of claim 13, wherein the operating comprises controlling an auxiliary converter to provide a battery charging function for the selected backup system.

18. The method of claim 13, wherein the operating comprises controlling an auxiliary converter to provide an active filtering function for signals generated by the selected backup system.

19. The method of claim 13, wherein the operating comprises ensuring that the selected backup system is constantly ready to provide power to the load.

20. The method of claim 13, further comprising upgrading software resident in the software unit to accommodate additional backup power systems.

21. An uninterruptible power supply (UPS) system which is configurable for connection to at least one backup power system, said UPS system comprising:
   universal UPS input circuitry having first circuitry required for connecting said at least one backup power system to said UPS system; and
   a plurality of slots configured to receive additional circuitry such that said universal UPS input circuitry can interconnect and operate in connection with at least one other backup power system that is different than said at least one backup power system coupled to said first circuitry.

22. The system of claim 21, wherein said additional circuitry comprises a diode bridge.

23. The system of claim 21, wherein said additional circuitry comprises a boost converter.

24. The system of claim 21, wherein said additional circuitry comprises an auxiliary converter.

25. The system of claim 21 further comprising a third backup power system that can be coupled to said UPS system without utilizing said universal UPS input circuitry.

26. An uninterruptible power supply (UPS) system, comprising:

a utility input for receiving AC power that is selectively provided to a load via a switch;

input circuitry that is configurable to operate in connection with at least one backup power system selected from one or more different types of backup power systems;

inverter circuitry coupled to said load, said switch, and said input circuitry; and a software unit coupled to said input circuitry and said inverter circuitry that configures said input circuitry to operate in connection with said at least one selected backup power system, said software unit operative to control the flow of power from said at least one selected backup power system to said load by controlling said input circuitry and said inverter circuitry.

* * * * *